United States Patent
Miyamoto et al.

(10) Patent No.: US 6,683,612 B2
(45) Date of Patent: Jan. 27, 2004

(54) ANIMATED IMAGE GENERATING METHOD AND APPARATUS, READABLE STORAGE MEDIUM STORING ANIMATED IMAGE PROCESSING PROGRAM AND VIDEO GAME SYSTEM

(75) Inventors: Takeshi Miyamoto, Amagasaki (JP); Tatsuya Shinkai, Suita (JP)

(73) Assignee: Konami Corporation, Tokyo (JP)

( * ) Notice: Subject to any disclaimer, the term of this patent is extended or adjusted under 35 U.S.C. 154(b) by 282 days.

(21) Appl. No.: 10/047,501

(22) Filed: Oct. 23, 2001

(65) Prior Publication Data

US 2002/0080140 A1 Jun. 27, 2002

(30) Foreign Application Priority Data

Oct. 31, 2000 (JP) .................... 2000-333816

(51) Int. Cl.[7] .............................. G06T 15/00
(52) U.S. Cl. ................................. 345/474
(58) Field of Search ................ 345/473, 474, 345/475, 619

(56) References Cited

U.S. PATENT DOCUMENTS

| | | | |
|---|---|---|---|
| 5,877,778 A | * 3/1999 | Dow et al. | 345/474 |
| 6,005,589 A | 12/1999 | Unuma et al. | 345/473 |
| 6,057,859 A | * 5/2000 | Handelman et al. | 345/474 |
| 6,070,269 A | * 6/2000 | Tardif et al. | 2/69 |
| 6,191,798 B1 | * 2/2001 | Handelman et al. | 345/473 |
| 6,270,414 B2 | * 8/2001 | Roelofs | 463/36 |

FOREIGN PATENT DOCUMENTS

EP  0840256  5/1998

OTHER PUBLICATIONS

A. Bruderlin, T.W. Calvert: "Goal Directed, Dynamic Animation of Human Walking" Proceedings of Siggraph, vol. 23, No. 3, Jul. 1989, pp. 233–242, XP002188192 *figures 2,5 * * p. 237, right–hand column, paragraph 4.2—p. 238, left–hand column, line 1 *.

* cited by examiner

*Primary Examiner*—Phu K. Nguyen
(74) *Attorney, Agent, or Firm*—Jordan and Hamburg LLP

(57) ABSTRACT

Both legs of a human figure P are each formed by two skeletons SK1, SK2 (SK3, SK4). A dynamic model is formed by a mass particle W located at a waist position A, an elastic body SP such as a spring coupling the mass particle W and a middle point B between the feet of both legs of the human figure P, and a damper DP. The positions of the skeletons SK1 to SK2 forming the legs can be dynamically obtained by calculating the waist position and further the positions of the knees using the dynamic model. Accordingly, movements of the legs can be expressed in such a manner as to give a good presence by dynamically calculating them every scene displayed as a game progresses.

14 Claims, 10 Drawing Sheets

FIG.2
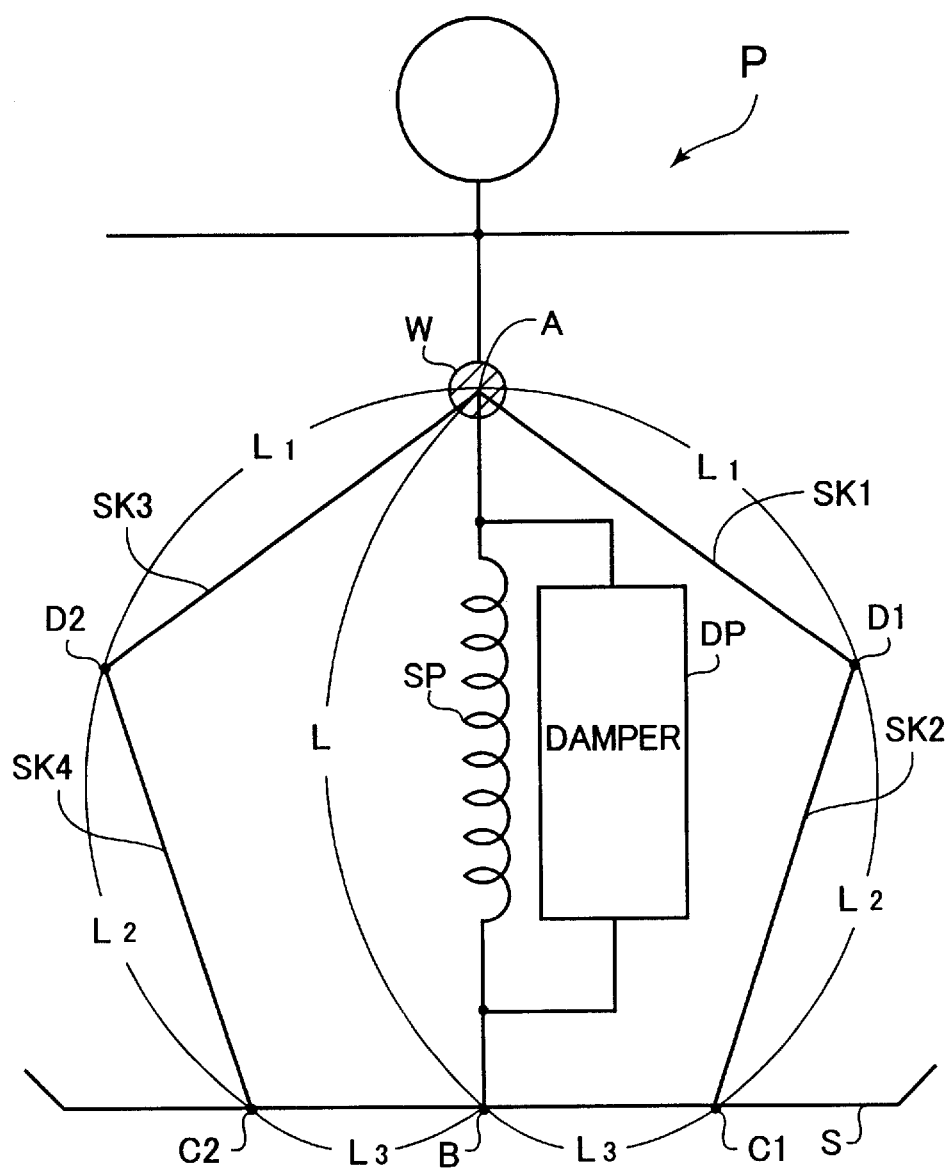
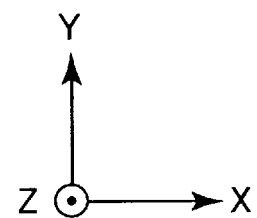

ANIMATED IMAGE GENERATING METHOD AND APPARATUS, READABLE STORAGE MEDIUM STORING ANIMATED IMAGE PROCESSING PROGRAM AND VIDEO GAME SYSTEM

The present invention relates to an animated image generating technique of executing a polygon mapping using skeletons, which technique is applicable to video games, computer graphics and the like.

BACKGROUND OF THE INVENTION AND RELATED ART STATEMENT

In recent years, various game systems in which characters are displayed in a simulated three-dimensional (3D) space generated on a monitor screen have been spread. Some of such game systems are known to simulate skiing, surfing, skate boarding, snow boarding, etc. In these games, leg movements when a center of gravity of a human figure's body vertically moves are particularly important in realizing a good feeling of presence (hereinafter, merely "presence")

On the other hand, if an attempt is made to finely express movements of a 3D model formed by polygons, the number of the polygons is increased and the CPU is largely burdened if coordinates of vertices are calculated one by one, with the result that it becomes difficult to move the 3D model in real time. Particularly, such a calculation method is not suitable for video games in which characters are caused to make various movements in a three-dimensional manner by promptly responding to operation by a game player.

Accordingly, a technique utilizing a multi-joint structure which makes movements using skeletons connecting joints has been adopted in recent years. This technique utilizing a multi-joint structure is briefly described with reference to FIG. 10. In FIG. 10, a character 90 represents a human in a simulated manner and is expressed as a multi-joint structure in which a multitude of joints 91 are provided at the same positions as those of an actual human. The respective joints 91 are connected by skeletons 92. The joint 91 at a portion corresponding to the waist serves as a reference point $A_0$, and skeletons $92_a$ connected with the reference point $A_0$ serve as parent skeletons and are defined by vectors with the reference point $A_0$ as an origin. The skeletons 92 extending from the parent skeletons $92_a$ to be successively connected with downstream-side body parts such as the head, both hands and both legs are defined by vectors based on the leading ends of the upstream-side skeletons by one stage. The outer surface of the character 90 is three-dimensionally displayed by a 3D model made of a necessary number of polygons specified in correspondence with the respective skeletons 92. In the case that the 3D model is caused to move, vector data (i.e. joint angle data) corresponding to a movement are successively given to the respective skeletons 92 as time passes, and the polygons corresponding to the respective skeletons 92 are successively displayed while changing their positions and angles as the skeletons 92 successively move. As a result, the 3D model appears to be moving.

Even if the technique utilizing the multi-joint structure is used, it has taken time to calculate the positions of the skeletons and it has been difficult to dynamically calculate the movements of the legs for every one of scenes displayed as the game progresses. Accordingly, movements of the legs corresponding to typical scenes are calculated in advance and stored as movement data. After discriminating whether or not the scene displayed as the game progresses belongs to any of the typical scenes, a corresponding movement data is read and displayed.

However, according to the above method, there is a limit in expressing movements of the legs which provide a sufficiently good presence due to a limit in the number of the movement data stored.

SUMMARY OF THE INVENTION

In view of the problem residing in the prior art, an object of the present invention is to provide animated image generating method and apparatus capable of expressing movements of legs which provide a good presence by dynamically calculating the movements of the legs for every one of scenes displayed as a game progresses, a readable storage medium storing an animated image generating program and a video game system.

In order to achieve the above object, according to the invention, an animated image generating apparatus in which each leg model is formed by two skeletons, one extending from a waist to a knee and the other extending from the knee to a foot, and the positions of the respective leg models are determined by position calculation of the skeletons, comprises: model setting means for specifying a dynamic model formed by a mass particle given at a waist position and a coupling body coupling a substantially middle point between the feet of both legs and the waist; foot determining means for determining the positions and speeds of the feet of both legs; waist position calculating means for calculating the position of the waist by dynamic calculation based on the positions and speeds of the feet of both legs given by the foot determining means using the dynamic model; and knee position calculating means for calculating the positions of the knees of both legs based on the positions of the feet of both legs determined by the foot determining means and the position of the waist calculated by the waist position calculating means. With this construction, since the positions of the skeletons forming the legs can be dynamically calculated by executing a relatively easy calculation, the movements of the legs corresponding to scenes can be expressed while avoiding an increase in loads on a processor, thereby giving a better presence.

These and other objects, features and advantages of the present invention will become more apparent upon a reading of the following detailed description and accompanying drawings.

BRIEF DESCRIPTION OF THE DRAWINGS

FIG. 2 is a diagram of a dynamic model used to calculate a waist position based on positions and speeds of feet of both legs.

DETAILED DESCRIPTION OF THE PREFERRED EMBODIMENTS OF THE PRESENT INVENTION

Figure 1:
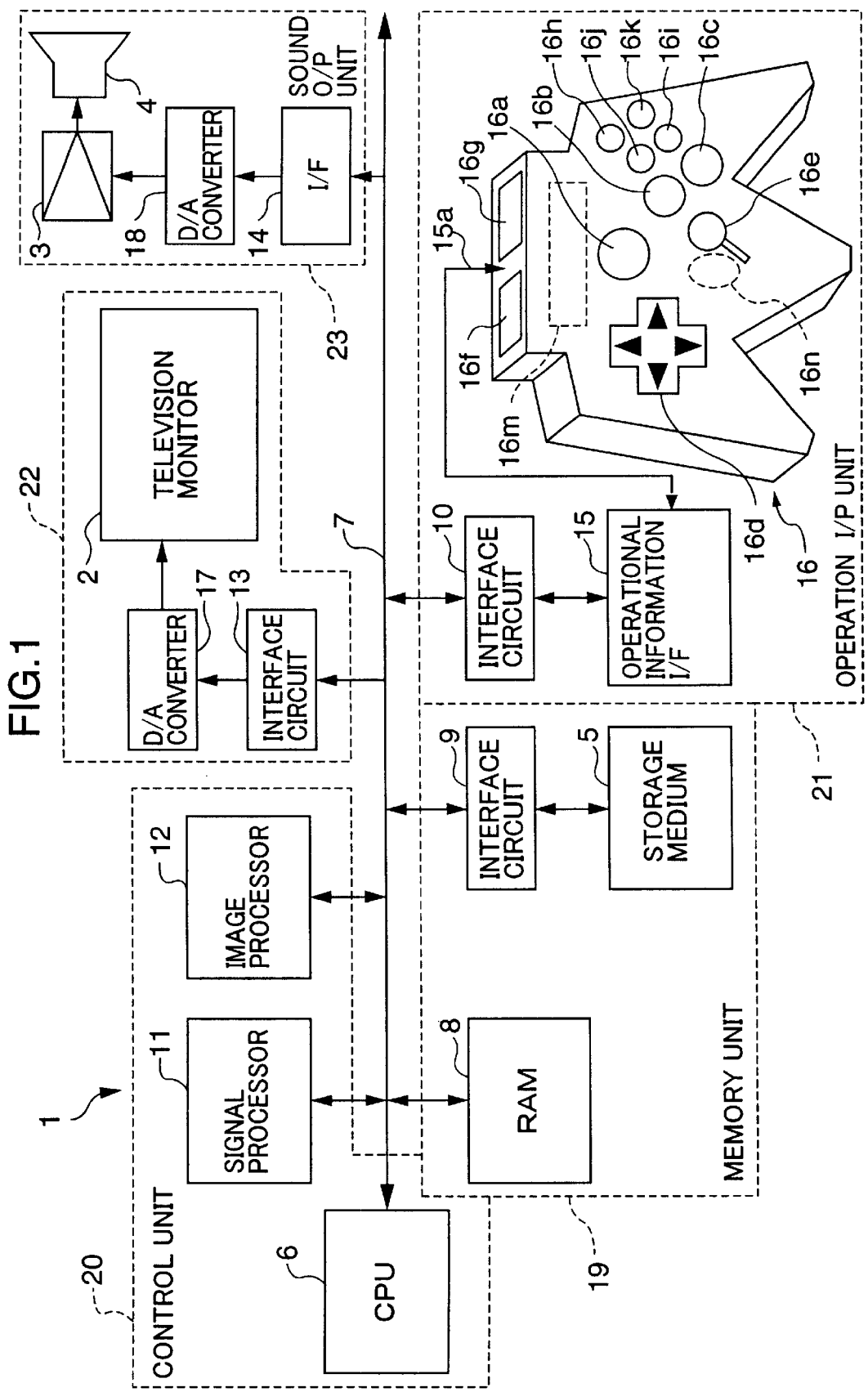
FIG. 1 is a block construction diagram showing one embodiment of a video game system according to the invention.

FIG. 1 is a block diagram showing one embodiment of a video game system according to the present invention. This game system 1 is provided with a main game unit, a television monitor 2 for displaying images of a game, an amplifying circuit 3 and a loudspeaker 4 for outputting sound effects and the like during a game, and a storage medium 5 storing game data including image data, sound data and program data. The storage medium 5 may be a so-called ROM cassette in which a ROM storing the game data and a program data of an operating system is contained in a plastic casing, an optical disk or a flexible disk. Depending on the mode of the game system 1, a built-in type ROM or the like may be used.

The main game unit is constructed such that buses 7 including address busses, data buses and control buses are connected with a CPU 6; a RAM 8, interface circuits 9, 10, a signal processor 11, an image processor 12, and interface circuits 13, 14 are connected with the buses 7; a controller 16 is connected with the interface circuit 10 via an operational information interface circuit 15; a digital-to-analog (D/A) converter 17 is connected with the interface circuit 13; and a D/A converter 18 is connected with the interface circuit 14.

A memory unit 19 is constructed by the RAM 8, the interface circuit 9 and the storage medium 5; a control unit 20 for controlling the progress of the game is constructed by the CPU 6, the signal processor 11 and the image processor 12; an operation input unit 21 is constructed by the interface circuit 10, the operational information interface circuit 15 and the controller 16; an image display unit 22 is constructed by the television monitor 2, the interface circuit 13 and the D/A converter 17; and a sound output unit 23 is constructed by the amplifying circuit 3, the loudspeaker 4, the interface circuit 14 and the D/A converter 18.

The signal processor 11 mainly performs calculation of positions of characters in a simulated 3D space, calculation to transform a position in the simulated 3D space to the one in a two-dimensional (2D) space, light source calculation, and reading and combination of various sound data.

The image processor 12 positions polygons forming an image to be formed in a display area of the RAM 8 and applies rendering such as texture mapping to these polygons based on the calculation result of the signal processor 11.

The controller 16 is provided with various buttons for selecting game contents, instructing the start of the game, and instructing actions, direction, etc. to a main character.

The mode of the game system 1 differs depending on its application. Specifically, the television monitor 2, the amplifying circuit 3 and the loudspeaker 4 are separate from the main game unit in the case that the game system 1 is constructed for home use, whereas all the elements shown in FIG. 1 are contained as a unit in one casing in the case that the game system 1 is constructed for business use.

In the case that the game system 1 is constructed with a personal computer or a workstation as a core, the television monitor 2 corresponds to a computer display, the image processor 12 corresponds to part of the game program data stored in the storage medium 5 or hardware on an extension board mounted on an extension slot of the computer, and the interface circuits 9, 10, 13, 14, the D/A converters 17, 18, and the operational information interface circuit 15 correspond to hardware on the extension board mounted on the extension slot of the computer. Further, the RAM 8 corresponds to a main memory of the computer or the respective areas of an extension memory.

A case where the game system 1 is constructed for home use is described below.

First, the operation of the game system 1 is briefly described. When a power switch (not shown) is turned on to activate the video game system 1, the CPU 6 reads image data, sound data and game program data from the storage medium 5 in accordance with the operating system stored in the storage medium 5. Part or all of the read image data, sound data and game program data are stored in the RAM 8.

Thereafter, the game is proceeded by the CPU 6 in accordance with the game program data stored in the RAM 8 and contents of instructions given by a game player via the controller 16. In other words, commands as tasks for forming images and outputting sounds are suitably generated in accordance with contents of instructions given by the game player via the controller 16.

The signal processor 11 performs calculation of positions of characters in the 3D space (of course the same applies for the 2D space), a light source calculation, reading and combination of various sound data in accordance with these commands.

Subsequently, the image processor 12 writes the image data to be formed in the display area of the RAM 8 based on the calculation result of the signal processor 11. The image data written in the RAM 8 is supplied via the interface circuit 13 to the D/A converter 17, which then supplies the image data to the television monitor 2 to display it as an image on the screen of the television monitor 2 after converting it into an analog video signal.

On the other hand, the sound data outputted from the signal processor 11 is supplied via the interface circuit 14 to the D/A converter 18, which in turn converts it into an analog sound signal (via a filter or the like). The converted signal is outputted as a game sound from the loudspeaker 4 as a sound generating means via the amplifying circuit 3. The game sounds refer to BGMs, various sound effects, presentation sounds, voices, etc.

FIG. 2 is a diagram of a dynamic model used to calculate a waist position. Directions of coordinate axes are shown at the right bottom side of FIG. 2, wherein X- and Z-axes extend in horizontal directions while a positive direction of Y-axis extends upward in vertical direction.

Each of two legs of a human figure P is formed by two skeletons SK1, SK2 (SK3, SK4). The dynamic model simulates the human figure P, and is comprised of a mass particle W of a mass M at a waist position A, and a coupling body coupling the mass particle W and a middle point B between feet C1, C2 of both legs of the human figure P. Here, the coupling body is assumed to be constructed by connecting a damper DP in parallel with an elastic body SP such as a spring. It is further assumed that L1, L2, L denote length of the skeletons SK1, SK3, length of the skeletons SK2, SK4 and distance between the waist position A and the middle point B, respectively. It is also assumed that the X-coordinate and Z-coordinate of the waist position A and the middle point B are constantly same. Thus, the waist position to be calculated is specifically the Y-coordinate of the waist position or the distance L.

Figure 3:
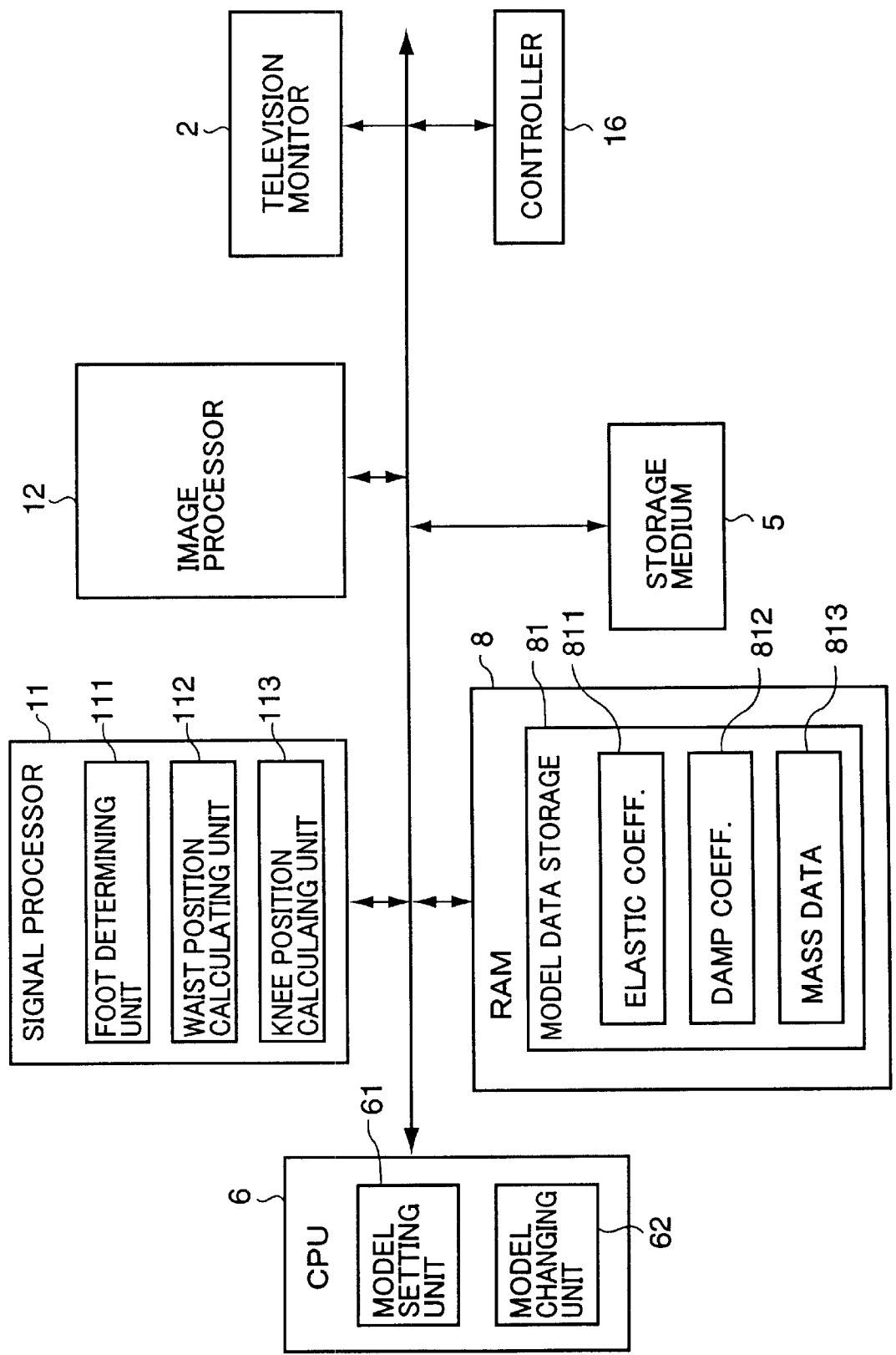
FIG. 3 is a block diagram showing an essential portion of an animated image generating apparatus.

FIG. 3 is a block diagram showing an essential portion of the animated image generating apparatus according to the present invention. The CPU 6 is provided with a model setting unit 61 for setting the mass m of the mass particle W and coupling conditions of the coupling body which specify the dynamic model used to calculate the waist position, and a model changing unit 62 for changing the mass m of the mass particle W and coupling conditions of the coupling body which specify the dynamic model used to calculate the waist position. Here, since the coupling body is constructed by connecting the damper DP in parallel with the elastic body SP such as a spring, the coupling conditions of the coupling body include an elastic coefficient of the elastic body SP and a damping coefficient of the damper DP. The mass m of the mass particle W and the coupling conditions of the coupling body set by the model setting unit 61 are stored in a model data storage 81 of the RAM 8 to be described later. When the mass m of the mass particle W and the coupling conditions of the coupling body are changed by the model changing unit 62, corresponding data in the model data storage 81 of the RAM 8 are rewritten.

The signal processor 11 is provided with a foot determining unit 111 for determining the positions and speeds of the feet of both legs of the human figure P, a waist position calculating unit 112 for calculating the waist position by dynamical calculation based on the positions and speeds of the feet given by the foot determining unit 111 using the dynamic model shown in FIG. 2, and a knee position calculating unit 113 for calculating the positions of the knees of both legs based on the positions of both feet determined by the foot determining unit 111 and the waist position calculated by the waist position calculating unit 112.

The waist position calculating unit 112 calculates the waist position after a predetermined time by calculating an acceleration of the mass particle W after calculating all forces (forces exerted from the gravity and the elastic body and a force exerted from the damper) exerted to the mass particle W located at the waist position of the dynamic model shown in FIG. 2 based on initial values of the positions and speeds of both feet given by the foot determining unit 111 and those of the position and speed of the waist.

The knee position calculating unit 113 calculates the positions of the knees of both legs (positions of points D1, D2 in FIG. 2) using a technique called inverse kinematics described later based on the positions of both feet determined by the foot determining unit 111 (positions of points C1, C2 in FIG. 2) and the waist position (position of point A in FIG. 2) calculated by the waist position calculating unit 112.

The RAM 8 includes the model data storage 81 for storing conditions of the dynamic model set by the model setting unit 61. The model data storage 81 is comprised of an elastic coefficient data portion 811 for storing the elastic coefficient of the elastic body SP, a damping coefficient data portion 812 for storing the damping coefficient of the damper DP, and a mass data portion 813 for storing the mass m of the mass particle W.

Figure 4:
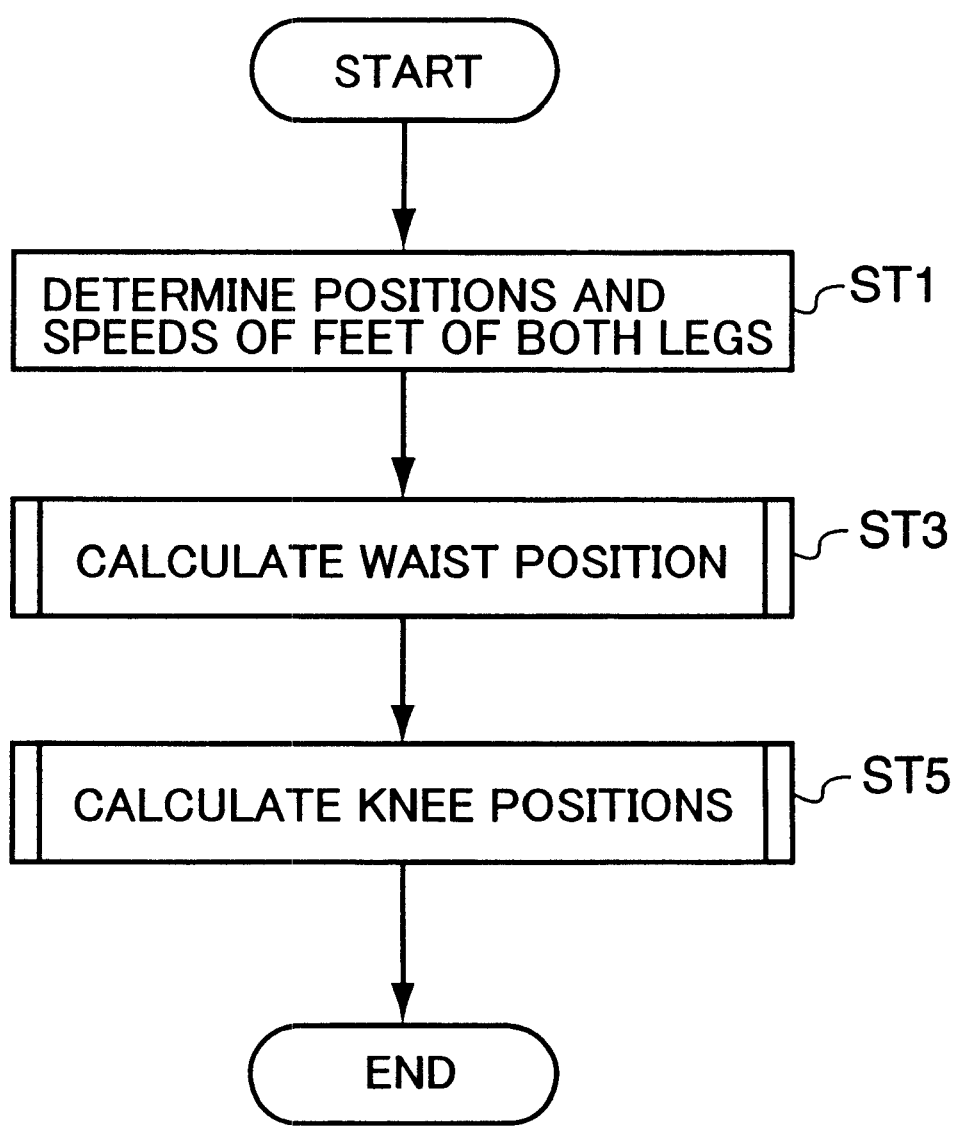
FIG. 4 is a flow chart briefly showing an operation of the animated image generating apparatus.

FIG. 4 is a flow chart briefly showing an operation of the animated image generating apparatus. Here, it is assumed that the conditions of the dynamic model are set in advance by the model setting unit 61 and are stored in the elastic coefficient data portion 811, the damping coefficient data portion 812 and the mass data portion 813. First, the foot determining unit 111 determines the positions and speeds of both feet of the character in accordance with a content of an instruction given by a game player via the controller 16 (Step ST1).

Subsequently, the waist position calculating unit 112 calculates the waist position based on the positions and speeds of both feet given by the foot determining unit 111 using the dynamic model in which the mass particle W is located at the waist position and the waist and the substantially middle point between both feet are coupled (Step ST3). Here, the conditions of the dynamic model are read from the model data storage 81.

Subsequently, the knee position calculating unit 113 calculates the positions of the knees of both legs based on the positions of both feet determined by the foot determining unit 111 and the waist position calculated by the waist position calculating unit 112 (Step ST5). Inverse kinematics to be described later is, for example, used for this calculation.

Figure 5:
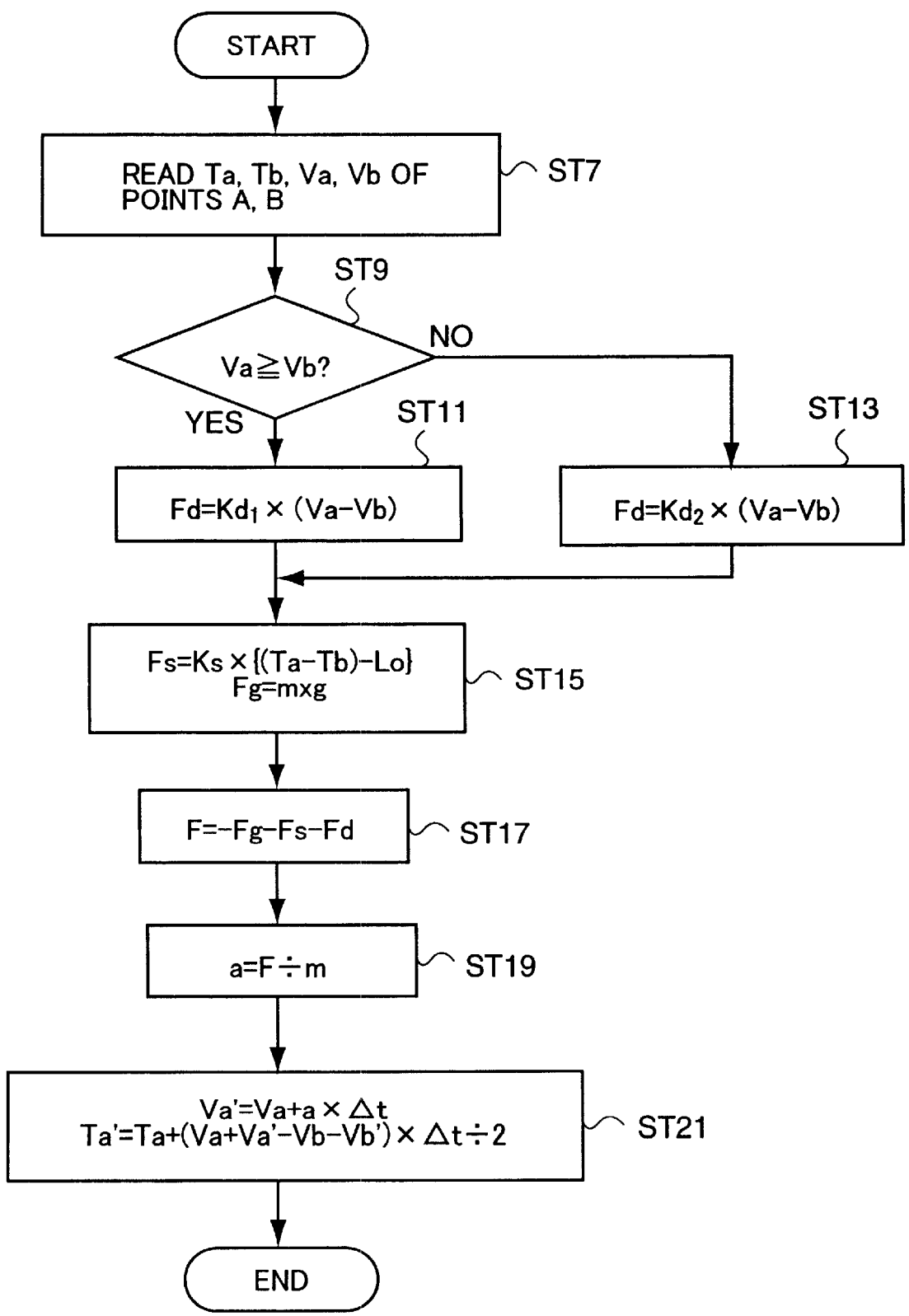
FIG. 5 is a flow chart executed to calculate the waist position based on the positions and speeds of both feet.

FIG. 5 is a flow chart executed to calculate the waist position (point A) based on the positions and speeds of both feet given by the foot determining unit 111 by means of the waist position calculating unit 112. Specifically, initial values Ta, Tb of the Y-coordinates of points A, B and initial values Va, Vb of the speeds of points A, B in Y-axis direction are given, and this flow chart is executed to calculate a Y-coordinate Ta' of point A and a speed Va' thereof in Y-axis direction after a predetermined time $\Delta t$. The waist positions (Y-coordinates of point A) can be successively calculated by executing this flow chart at intervals of the predetermined time. It should be noted that a Y-coordinate Tb' of point B and a speed Vb' thereof in Y-axis direction after the predetermined time $\Delta t$ are determined in accordance with a content of an instruction given via the controller 16 by means of the foot determining unit 111.

First, the initial values Ta, Tb, Va, Vb are read (Step ST7). It is then discriminated whether Va$\geq$Vb (Step ST9). If Va$\geq$Vb, the damper DP moves in an elongating direction and, accordingly, a downward acting force Fd exerted to the mass particle W by the damper DP is calculated by Fd=Kd$_1$× (Va−Vb) using a damping coefficient Kd$_1$ at the time of elongation of the damper DP (Step ST11). If Va<Vb, the damper DP moves in a contracting direction and, accordingly, the downward acting force Fd exerted to the mass particle W by the damper DP is calculated by Fd=Kd$_2$× (Va−Vb) using a damping coefficient Kd$_2$ at the time of contraction of the damper DP (Step ST13).

A downward acting force Fs exerted to the mass particle W by the elastic body SP is calculated by Fs=Ks×{(Ta−Tb)− L$_0$} using an elastic coefficient Ks. Here, L$_0$ denotes a distance between points A and B when the elastic body SP has a natural length (length when no force acts thereon). Gravity Fg acting on the mass particle W is calculated by Fg=m×g where g is an acceleration of gravity (Step ST15).

A resultant of forces F exerted to the mass particle W is then calculated by F=−Fg−Fs−Fd with upward acting forces as positive (Step ST17), and an upward acting acceleration a of the mass particle W is calculated by a=F÷m (Step ST19). Subsequently, the speed Va' of point A in Y-axis direction after the predetermined time $\Delta t$ is calculated by Va'=Va+a×$\Delta t$, and the Y-coordinate Ta' of point A after the predetermined time $\Delta t$ is calculated by Ta'=Ta+(Va'+Va− Vb'−Vb)×$\Delta t$÷2 (Step ST21).

Figure 6:
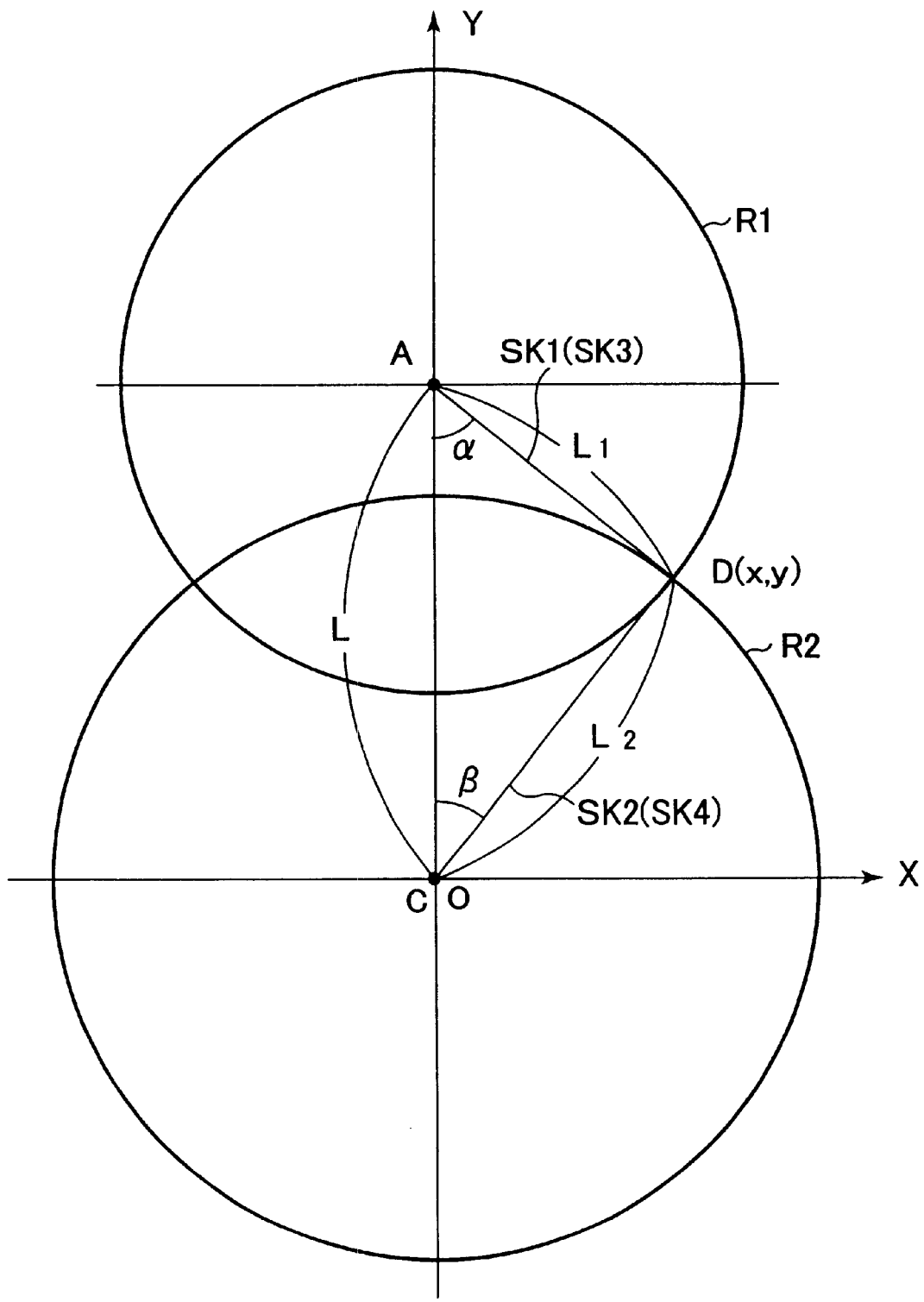
FIG. 6 is a diagram showing calculation of positions of knees based on the positions of both feet and the waist position.
Figure 7:
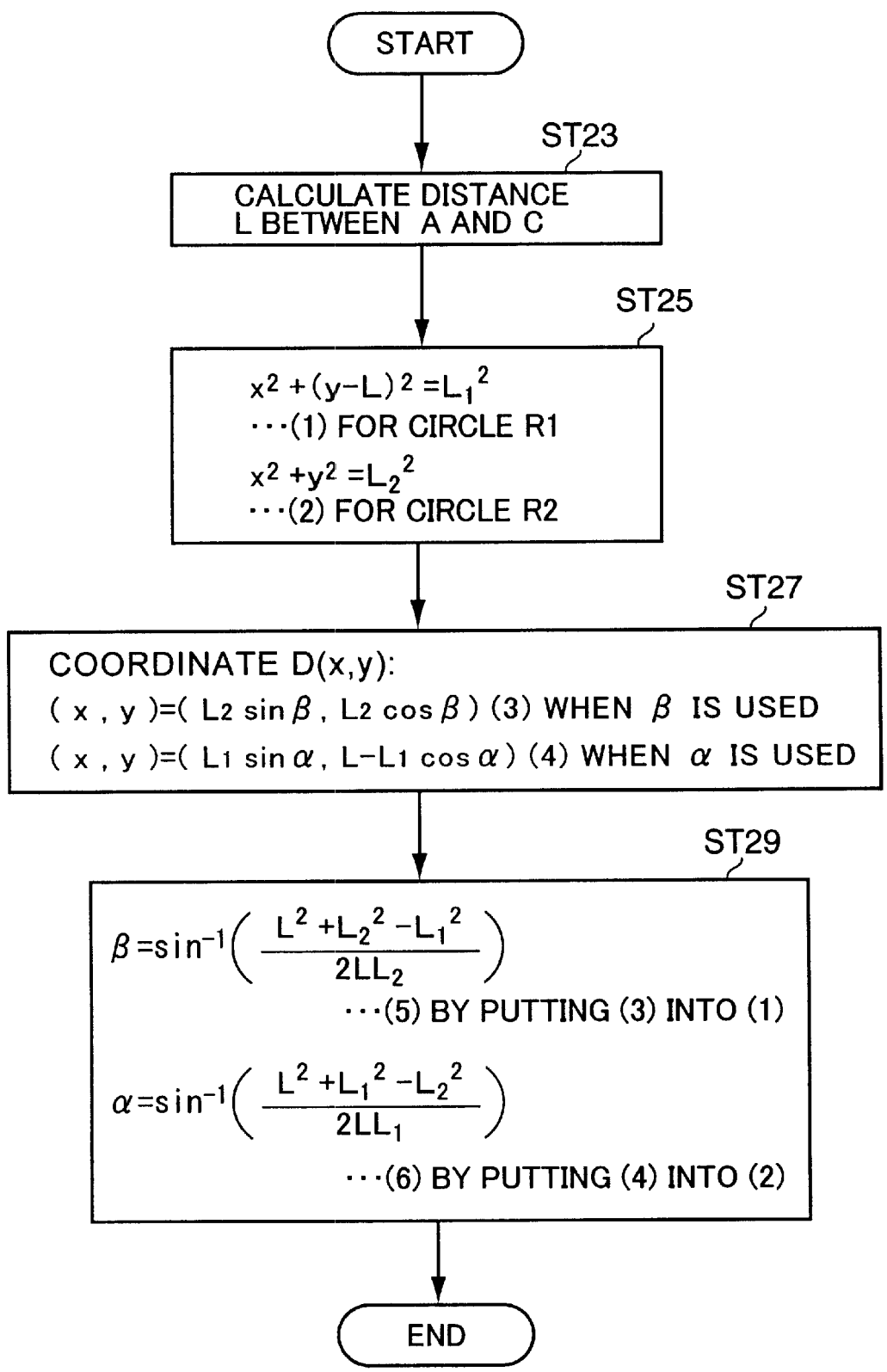
FIG. 7 is a flow chart executed to calculate the positions of the knees based on the positions of both feet and the waist position.

FIGS. 6 and 7 are a diagram and a flow chart showing how the knee position calculating unit 113 calculates the positions of the knees of both legs based on the positions and speeds of both feet determined by the foot determining unit 111 and the waist position calculated by the waist position calculating unit 112 using inverse kinematics. Here, in order to simplify the description, it is assumed that point C (point C1 or C2) is located at the origin and point A is located on Y-axis, and the knee position is referred to as point D. On the other hand, since the skeletons are expressed as vectors from a reference point, the knee position D is expressed by an angle CAD (here, "$\alpha$") and an angle ACD (here, "$\beta$").

First, the distance L between points A and C is calculated based on the positions (C1 and C2) of both feet determined by the foot determining unit 111 and the waist position (distance between points A and B) calculated by the waist position calculating unit 112 (Step ST23). Subsequently, equation (1) of a circle R1 having a radius $L_1$ and centered at point A and equation (2) of a circle R2 having a radium $L_2$ and centered at point C are obtained (Step ST25). Subsequently, coordinates of point D are expressed as in equation (3) using $\beta$ and expressed as in equation (4) using a (Step ST27). Equation (5) is obtained by solving equation obtained by putting equation (3) into equation (1) for $\beta$, and equation (6) is obtained by solving equation obtained by putting equation (4) into equation (2) for $\alpha$ (Step ST29). Thus, $\alpha$, $\beta$ can be obtained by equations (5) and (6).

Figure 8:
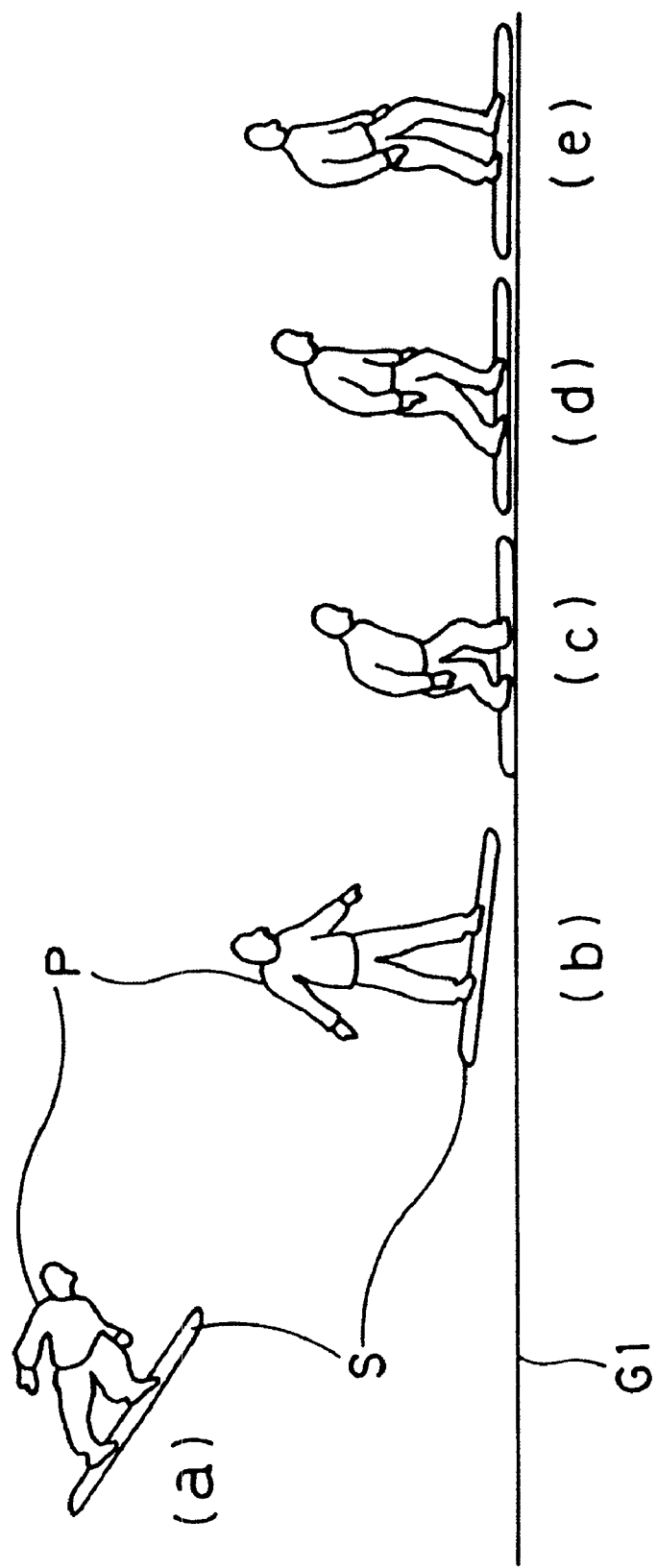
FIG. 8 is a diagram showing scenes where a human figure on a snow board lands on a flat slope after jumping.
Figure 9:
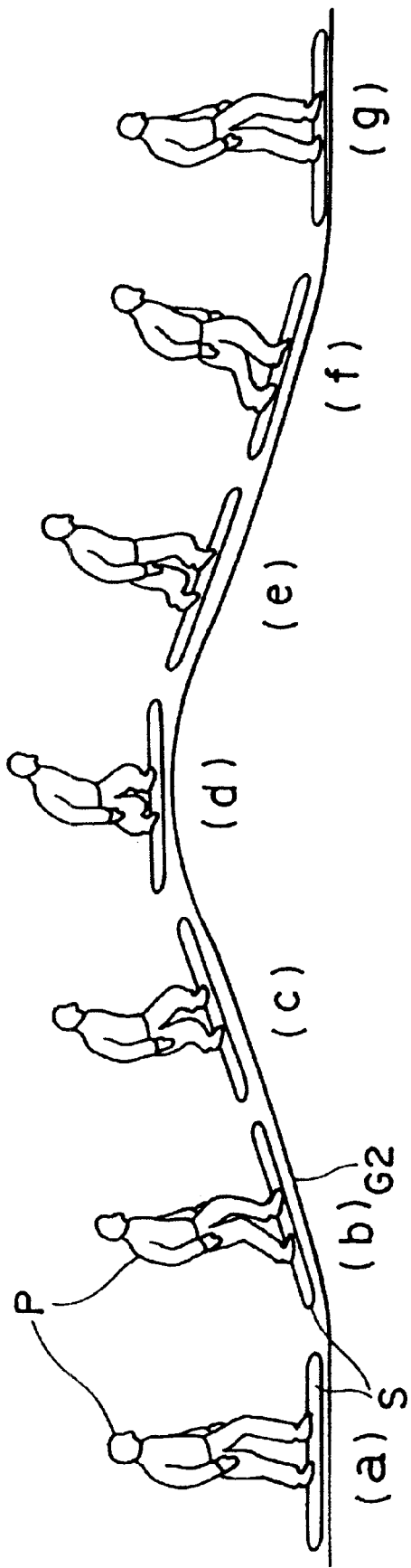
FIG. 9 is a diagram showing scenes where the human figure on the snow board slides on an uneven slope.
Figure 10:
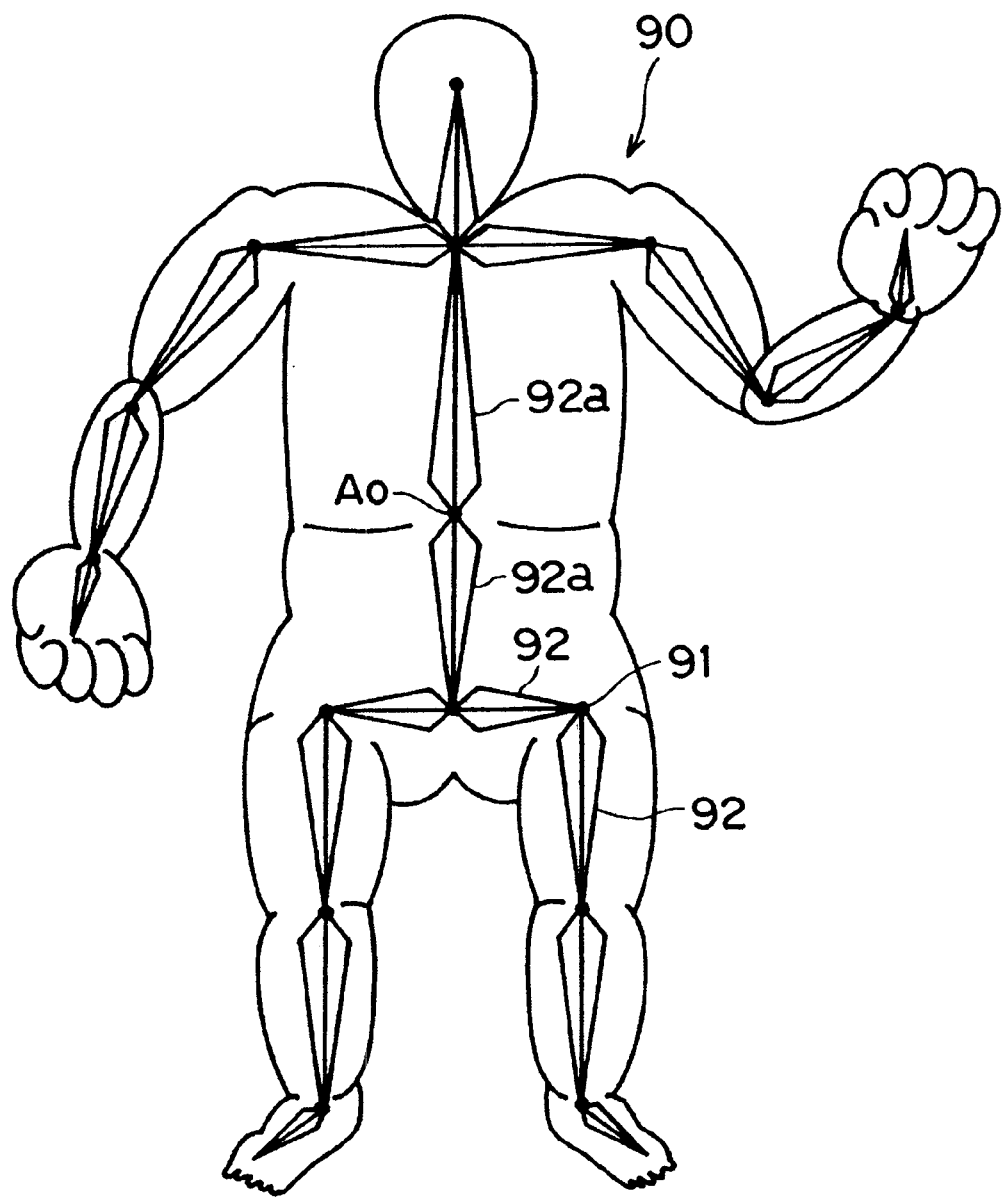
FIG. 10 is a diagram briefly showing a technique utilizing a multi-joint structure which is caused to move using skeletons connecting joints.

In the following description, a case where movements of the legs of the human figure P standing on a snow board S are calculated using the animated image generating apparatus according to the present invention is described. FIG. 8 is a diagram showing scenes when the human figure P standing on the snow board S lands on a flat slope G1 after a jump, and FIG. 9 is a diagram showing scenes when the human figure P standing on the snow board S slides on an uneven slope G2. With reference to FIGS. 8 and 9, the functions and effects of the dynamic model used in the waist position calculating unit 112 are qualitatively described.

First, the scenes shown in FIG. 8 are described. In a jumped state (initial state), the knees of the human figure P are bent as shown in (a). Since no weight rests on his legs up to a point immediately before he lands on the slope G1, a state where the knees are stretched as in (b) is expressed by the action of an elastic restoring force of the elastic body SP. Immediately after landing, a state where the knees are bent due to an increased force exerted on the legs to support the body P as in (c) is expressed by the contraction of the elastic body SP caused by the action of an inertial force of the mass particle M. As time passes after landing, a state where the knees are gradually stretched due to a decreasing force exerted on the legs as in (d), (e) is expressed by the elongation of the elastic body SP by the action of its elastic restoring force.

Further, no unnatural vibration is generated since the dynamic model includes the damper DP.

Next, the scenes shown in FIG. 9 are described. In an initial state, the knees of the human figure P are naturally bent as in (a). On an upward slope of the slope G2, a state where the knees are gradually bent further due to an increasing force exerted on the legs to support the body P ascending on the upward slope as in (b) to (d) is expressed by the contraction of the elastic body SP upon the action of the inertial force of the mass particle M thereon. On a downward slope of the slope G2, a state where the knees are gradually stretched due to a decreasing force exerted on the legs to support the body P as in (e) to (g) is expressed by the elongation of the elastic body SP upon the action of the elastic restoring force thereof. Similar to the case of FIG. 8, no unnatural vibration is generated since the dynamic model includes the damper DP.

The present invention may also be embodied as follows.

(A) The conditions of the dynamic model used in the calculation of the waist position are set beforehand in the foregoing embodiment. However, conditions of a plurality of dynamic models may be stored in the RAM 8 or the storage medium 5 beforehand, the conditions of the dynamic model may be selected by, for example, letting the game player select a character or an other method, and the conditions of the selected dynamic model may be read from the RAM 8 or the storage medium 5. In such a case, the movements of the legs desired by the game player can be set, making the game more interesting.

(B) Although the coupling body of the dynamic model used in the calculation of the waist position is constructed by connecting the elastic body and the damper in parallel in the foregoing embodiment, it may be constructed only by the elastic body. In such a case, calculation is simpler, and loads on the processor can be reduced.

(C) Although the model data storage for storing the conditions of the dynamic model is provided in the RAM 8 in the foregoing embodiment, the conditions of the dynamic model may be transferred from the storage medium 5 to the RAM 8 every time it is necessary as the game progresses. Such a mode has an advantage of reducing a necessary capacity of the RAM 8.

In summary, the present invention relates to an animated image generating apparatus in which each leg model is formed by two skeletons, one extending from a waist to a knee and the other extending from the knee to a foot, and the positions of the respective leg models are determined by position calculation of the skeletons. The apparatus comprises model setting means for specifying a dynamic model formed by a mass particle given at a waist position and a coupling body coupling a substantially middle point between the feet of both legs and the waist; foot determining means for determining the positions and speeds of the feet of both legs; waist position calculating means for calculating the position of the waist by dynamic calculation based on the positions and speeds of the feet of both legs given by the foot determining means using the dynamic model; and knee position calculating means for calculating the positions of the knees of both legs based on the positions of the feet of both legs determined by the foot determining means and the position of the waist calculated by the waist position calculating means. With this construction, since the positions of the skeletons forming the legs can be dynamically calculated by executing a relatively easy calculation, the movements of the legs corresponding to scenes can be expressed while avoiding an increase in loads on a processor, thereby giving a better presence.

The model setting means may be configured to enable setting of at least one of a mass of the mass particle and a coupling condition of the coupling body. With this construction, the weight, the bent states of the knees, etc. can be set by the model setting means and, therefore, the movements of the legs a user desires can be expressed.

The aforementioned animated image generating apparatus may further comprise model changing means for changing at least one of a mass of the mass particle and a coupling condition of the coupling body. With this construction, the weight, the bent states of the knees, etc. can be set by the model changing means as a character or the like is changed and, therefore, the movements of the legs suitable for the character or the like can be expressed.

The aforementioned coupling body can take a form of an elastic body and the coupling condition may include an elastic coefficient of the elastic body. With this construction, elastic forces possessed by the knees can be expressed by the elastic body, and the movements of the knees can be dynamically expressed by executing a simple calculation.

The coupling body may be constructed by connecting a damper in parallel with an elastic body and the coupling condition includes an elastic coefficient of the elastic body and a damping coefficient of the damper. With this construction, an unnatural vibration generated in the case of constructing the coupling body only by the elastic body can be suppressed by the damper and, therefore, the movements of the knees can be expressed in such a manner as to give a better presence by executing a relatively simple calculation.

The knee position calculating means may adopt a technique of inverse kinematics. With this construction, since the positions of the knees can be effectively calculated by inverse kinematics based on the positions of the feet and the waist position, the loads on the processor can be reduced.

Another form of the present invention relates to a readable storage medium storing an animated image generating program in which each leg model is formed by two skeletons, one extending from a waist to a knee and the other extending from the knee to a foot, and the positions of the respective leg models are determined by position calculation of the skeletons. The program comprise the steps of: specifying a dynamic model formed by a mass particle given at a waist position and a coupling body coupling a substantially middle point between the feet of both legs and the waist; determining the positions and speeds of the feet of both legs; calculating the position of the waist by dynamic calculation based on the positions and speeds of the feet of both legs given by the foot determining processing using the dynamic model; and calculating the positions of the knees of both legs based on the positions of the feet of both legs determined by the foot determining processing and the position of the waist calculated by the waist position calculating processing. According to the storage medium containing the above program, since the positions of the skeletons forming the legs can be dynamically calculated by executing a relatively easy calculation, the movements of the legs corresponding to scenes can be expressed while avoiding an increase in loads on a processor, thereby giving a better presence.

In the readable storage medium, at least one of a mass of the mass particle and a coupling condition of the coupling body may be set in the model setting processing. According to this program, the weight, the bent states of the knees, etc. can be set by the model setting processing and, therefore, the movements of the legs a user desires can be expressed.

In the readable storage medium, the program may further comprise a step of changing at least one of a mass of the mass particle and a coupling condition of the coupling body. According to this storage medium, the weight, the bent states of the knees, etc. can be set by the model changing processing as a character or the like is changed and, therefore, the movements of the legs suitable for the character or the like can be expressed.

In the readable storage medium, the coupling body may be an elastic body and the coupling condition may include an elastic coefficient of the elastic body. According to this configuration, elastic forces possessed by the knees can be expressed by the elastic body, and the movements of the knees can be dynamically expressed by executing a simple calculation.

In the readable storage medium, the coupling body may be constructed by connecting a damper in parallel with an elastic body and the coupling condition may include an elastic coefficient of the elastic body and a damping coefficient of the damper. According to this configuration, an unnatural vibration generated in the case of constructing the coupling body only by the elastic body can be suppressed by the damper and, therefore, the movements of the knees can be expressed in such a manner as to give a better presence by executing a relatively simple calculation.

In the readable storage medium, the knee position calculating processing may adopt the technology of inverse kinematics. According to this configuration, since the positions of the knees can be effectively calculated by inverse kinematics based on the positions of the feet and the waist position, the loads on the processor can be reduced.

Another form of the present invention relates to an animated image generating method according to which each leg model is formed by two skeletons, one extending from a waist to a knee and the other extending from the knee to a foot, and the positions of the respective leg models are determined by position calculation of the skeletons. The method comprise the steps of: specifying a dynamic model formed by a mass particle given at a waist position and a coupling body connecting a substantially middle point between the feet of both legs and the waist; determining the positions and speeds of the feet of both legs; calculating the position of the waist by dynamic calculation based on the positions and speeds of the feet of both legs given in the foot determining step using the dynamic model; and calculating the positions of the knees of both legs based on the positions of the feet of both legs determined in the foot determining step and the position of the waist calculated in the waist position calculating step. According to this method, since the positions of the skeletons forming the legs can be dynamically calculated by executing a relatively easy calculation, the movements of the legs corresponding to scenes can be expressed while avoiding an increase in loads on a processor, thereby giving a better presence.

Another form of the invention relates also to a video game system which comprise any one of the aforementioned animated image generating apparatuses; image display means for displaying animated images; program storage means for storing a game program data; and externally operable operation means and wherein the animated image generating apparatus displays images on the image display means in accordance with the game program data. With this construction, since the positions of the skeletons forming the legs can be dynamically calculated by executing a relatively easy calculation, the movements of the legs corresponding to scenes can be expressed while avoiding an increase in loads on a processor. Therefore, a game system which can give a good presence can be realized.

This application is based on Japanese patent application serial no. 2000-333816 filed in Japan on Oct. 31, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An animated image generating apparatus in which each leg model is formed by two skeletons, one extending from a waist to a knee and the other extending from the knee to a foot, and the positions of the respective leg models are determined by position calculation of the skeletons, comprising:

model setting means for specifying a dynamic model formed by a mass particle given at a waist position and a coupling body coupling a substantially middle point between the feet of both legs and the waist, foot determining means for determining the positions and speeds of the feet of both legs, waist position calculating means for calculating the position of the waist by dynamic calculation based on the positions and speeds of the feet of both legs given by the foot determining means using the dynamic model, and knee position calculating means for calculating the positions of the knees of both legs based on the positions of the feet of both legs determined by the foot determining means and the position of the waist calculated by the waist position calculating means.

2. An animated image generating apparatus according to claim 1, wherein the model setting means sets at least one of a mass of the mass particle and a coupling condition of the coupling body.

3. An animated image generating apparatus according to claim 1, further comprising model changing means for changing at least one of a mass of the mass particle and a coupling condition of the coupling body.

4. An animated image generating apparatus according to claim 1, wherein the coupling body is an elastic body and the coupling condition includes an elastic coefficient of the elastic body.

5. An animated image generating apparatus according to claim 1, wherein the coupling body is constructed by connecting a damper in parallel with an elastic body and the coupling condition includes an elastic coefficient of the elastic body and a damping coefficient of the damper.

6. An animated image generating apparatus according to claim 1, wherein the knee position calculating means adopts inverse kinematics.

7. A readable storage medium storing an animated image generating program in which each leg model is formed by two skeletons, one extending from a waist to a knee and the other extending from the knee to a foot, and the positions of the respective leg models are determined by position calculation of the skeletons, the program comprising the steps of:

specifying a dynamic model formed by a mass particle given at a waist position and a coupling body coupling a substantially middle point between the feet of both legs and the waist, determining the positions and speeds of the feet of both legs, calculating the position of the waist by dynamic calculation based on the positions and speeds of the feet of both legs given by the foot determining processing using the dynamic model, and calculating the positions of the knees of both legs based on the positions of the feet of both legs determined by the foot determining processing and the position of the waist calculated by the waist position calculating processing.

8. A readable storage medium according to claim 7, wherein at least one of a mass of the mass particle and a coupling condition of the coupling body is set in the model setting processing.

9. A readable storage medium according to claim 8, wherein the program further comprises a step of changing at least one of a mass of the mass particle and a coupling condition of the coupling body.

10. A readable storage medium according to claim 7, wherein the coupling body is an elastic body and the coupling condition includes an elastic coefficient of the elastic body.

11. A readable storage medium according to claim 7, wherein the coupling body is constructed by connecting a damper in parallel with an elastic body and the coupling condition includes an elastic coefficient of the elastic body and a damping coefficient of the damper.

12. A readable storage medium according to claim 7, wherein the knee position calculating processing adopts inverse kinematics.

13. An animated image generating method according to which each leg model is formed by two skeletons, one extending from a waist to a knee and the other extending from the knee to a foot, and the positions of the respective leg models are determined by position calculation of the skeletons, the method comprising the steps of:

specifying a dynamic model formed by a mass particle given at a waist position and a coupling body connecting a substantially middle point between the feet of both legs and the waist, determining the positions and speeds of the feet of both legs, calculating the position of the waist by dynamic calculation based on the positions and speeds of the feet of both legs given in the foot determining step using the dynamic model, and calculating the positions of the knees of both legs based on the positions of the feet of both legs determined in the foot determining step and the position of the waist calculated in the waist position calculating step.

14. A video game system comprising:

an animated image generating apparatus in which each leg model is formed by two skeletons, one extending from a waist to a knee and the other extending from the knee to a foot, and the positions of the respective leg models are determined by position calculation of the skeletons, the animated image generating apparatus including:

model setting means for specifying a dynamic model formed by a mass particle given at a waist position and a coupling body coupling a substantially middle point between the feet of both legs and the waist, foot determining means for determining the positions and speeds of the feet of both legs, waist position calculating means for calculating the position of the waist by dynamic calculation based on the positions and speeds of the feet of both legs given by the foot determining means using the dynamic model, and knee position calculating means for calculating the positions of the knees of both legs based on the positions of the feet of both legs determined by the foot determining means and the position of the waist calculated by the waist position calculating means, image display means for displaying animated images, program storage means for storing a game program data, and externally operable operation means, wherein the animated image generating apparatus displays images on the image display means in accordance with the game program data.

* * * * *